(12) United States Patent
Kwon et al.

(10) Patent No.: US 10,952,427 B2
(45) Date of Patent: Mar. 23, 2021

(54) MOSQUITO REPELLENT DEVICE AND MOBILE TERMINAL

(71) Applicant: LG ELECTRONICS INC., Seoul (KR)

(72) Inventors: Youngin Kwon, Seoul (KR); Hangseok Kim, Seoul (KR); Minho Park, Seoul (KR); Hyunsuk Yang, Seoul (KR); Jaeyoung Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/640,958

(22) PCT Filed: Jan. 25, 2018

(86) PCT No.: PCT/KR2018/001127
§ 371 (c)(1),
(2) Date: Feb. 21, 2020

(87) PCT Pub. No.: WO2019/039678
PCT Pub. Date: Feb. 28, 2019

(65) Prior Publication Data
US 2020/0170238 A1    Jun. 4, 2020

(30) Foreign Application Priority Data
Aug. 22, 2017 (KR) .................. 10-2017-0105878

(51) Int. Cl.
*A01M 29/18* (2011.01)
*H04M 1/02* (2006.01)

(52) U.S. Cl.
CPC .............. *A01M 29/18* (2013.01); *H04M 1/02* (2013.01)

(58) Field of Classification Search
CPC ......... A01M 29/18; A01M 29/16; H04M 1/02
See application file for complete search history.

(56) References Cited

U.S. PATENT DOCUMENTS

| | | | |
|---|---|---|---|
| D880,645 S * | 4/2020 | Gu | ............................ D22/119 |
| 2014/0177902 A1 | 6/2014 | Yeh | |
| 2015/0128877 A1* | 5/2015 | McIntyre | .................. A45F 3/00 |
| | | | 119/712 |

FOREIGN PATENT DOCUMENTS

| | | |
|---|---|---|
| KR | 1020060078881 | 7/2006 |
| KR | 101471572 | 12/2014 |
| KR | 1020150087520 | 7/2015 |
| KR | 1020150116277 | 10/2015 |

OTHER PUBLICATIONS

PCT International Application No. PCT/KR2018/001127, Written Opinion of the International Searching Authority dated Jun. 27, 2018, 16 pages.

* cited by examiner

*Primary Examiner* — Hongmin Fan
(74) *Attorney, Agent, or Firm* — Lee, Hong, Degerman, Kang & Waimey

(57) ABSTRACT

Provided is a mobile terminal performing a mosquito repelling function. The mobile terminal with the mosquito repelling function comprises: a frame forming a full length part to minimize the thickness of a mosquito repelling device and ensure sufficient rigidity; a battery provided on the back surface of the frame; a rear cover detachably coupled to the back surface of the frame; and a mosquito repelling device coupled to the inner surface of the rear cover.

10 Claims, 10 Drawing Sheets

US 10,952,427 B2

MOSQUITO REPELLENT DEVICE AND MOBILE TERMINAL

CROSS-REFERENCE TO RELATED APPLICATIONS

This application is the National Stage filing under 35 U.S.C. 371 of International Application No. PCT/KR2018/001127, filed on Jan. 25, 2018, which claims the benefit of earlier filing date and right of priority to Korean Application No. 10-2017-0105878, filed on Aug. 22, 2017, the contents of which are all hereby incorporated by reference herein in their entirety.

TECHNICAL FIELD

The present disclosure relates to a mosquito repellent apparatus and a mobile terminal having the mosquito repellent apparatus.

BACKGROUND ART

Functions of a mobile terminal are diversifying. For example, there are functions of data and voice communications, photo taking and video shooting using a camera, voice recording, music file playback through a speaker system, and outputting an image or a video on a display. An electronic game play function is added to some terminals, and some terminals perform a multimedia player function. In particular, a recent mobile terminal may receive a multicast signal that provides visual content such as a broadcast, the video, or a television program.

In addition to such functions that actively use the display, third functions that are not directly relevant to the display may also be performed using a battery or a circuit disposed in the mobile terminal.

As one of such third functions, a mosquito repellent function may be implemented in the mobile terminal. The mosquito repellent function generates high frequencies that mosquitoes dislike to repel the mosquito around the mobile terminal. This may be implemented as a piezo speaker that generates the high frequencies, and the like.

When the mobile terminal has the mosquito repellent function, it is required that physical components for performing the mosquito repellent function are respectively formed in the smallest sizes as much as possible and in appropriate shapes, and are properly coupled with each other. Further, in order to perform vibration in a proper range, the smallest sizes of the components and a vibration space must be secured. At the same time, stiffness, and structural and functional reliabilities of a device are still required to the physical components and the mobile terminal that perform the mosquito repellent function that requires miniaturization.

DISCLOSURE

Technical Problem

The present disclosure aims to solve the problem of increasing of the thickness of the mobile terminal having the mosquito repellent function or the problem of the weak stiffness described above.

Technical Solutions

According to one aspect of the present disclosure to achieve the above or another purpose, provided is a mosquito repellent apparatus including an upper casing for defining first multi-holes therein, a lower casing coupled to the upper casing, and defining a separate space together with the upper casing between the lower casing and the upper casing, and a vibrator including a copperplate layer and a ceramic layer, and disposed in the separate space, wherein the lower casing includes a planar portion, and a protruding portion forming a bend from the planar portion to support an outer peripheral region of a rear face of the vibrator, wherein the upper casing includes a first face opposite to a central region of the vibrator and having the first multi-holes defined therein, a second face for forming a step from the first face to support an outer peripheral region of a front face of the vibrator, a third face for forming a step from the second face to be in contact with one region of the planar portion of the lower casing, and first screw holes respectively penetrating one point of one region of the planar portion and one point of the third face overlapping said one point of the planar portion.

Further, according to another aspect of the present disclosure, provided is a mosquito repellent apparatus, characterized in that the upper casing contains STS, and the first face, the second face, the third face, and the first screw holes are formed at the same time through a stamping process.

Further, according to another aspect of the present disclosure, provided is a mosquito repellent apparatus, characterized in that a soft lower tape disposed between the protruding portion and the outer peripheral region of the rear face of the vibrator, and a soft upper tape disposed between the second face and an outer peripheral region of a top face of the vibrator are further included.

Further, according to another aspect of the present disclosure, provided is a mosquito repellent apparatus, characterized in that the vibrator has a circular shape, each of one region of the planar portion and the third face includes a donut-shaped plane, and each of the first screw holes includes four holes positioned at four points on each of the donut-shaped planes and spaced apart from each other.

Further, according to another aspect of the present disclosure, provided is a mobile terminal including a frame for defining an electronic component portion, a battery disposed on a rear face of the frame, a rear cover detachably coupled to the rear face of the frame, and a mosquito repellent apparatus coupled to an inner face of the rear cover, wherein the mosquito repellent apparatus includes an upper casing for defining first multi-holes therein, a lower casing coupled to the upper casing, and defining a separate space together with the upper casing between the lower casing and the upper casing, and a vibrator including a copperplate layer and a ceramic layer, and disposed in the separate space, wherein the lower casing includes a planar portion and a protruding portion forming a bend from the planar portion to support an outer peripheral region of a rear face of the vibrator, wherein the upper casing includes a first face opposite to a central region of the vibrator and having the first multi-holes defined therein, a second face for forming a step from the first face to support an outer peripheral region of a front face of the vibrator, a third face for forming a step from the second face to be in contact with one region of the planar portion of the lower casing, and each first screw hole penetrating at least one point of each of one region of the planar portion and third face.

Further, according to another aspect of the present disclosure, provided is a mobile terminal, characterized in that the rear cover includes a seating portion defined in one region of an inner face thereof to define a region for seating the upper casing of the mosquito repellent apparatus therein, a recessed portion defined in one region around the seating portion to define a region recessed outwardly, a second screw hole defined at a position of the seating portion corresponding to positions of the first screw holes, a screw penetrating the first screw holes and the second screw hole, an outlet portion defined in the seating portion to define second multi-holes corresponding to the first multi-holes, and ribs forming a lattice pattern formed on an inner face of the recessed portion.

Further, according to another aspect of the present disclosure, provided is a mobile terminal, characterized in that at least one region of the mosquito repellent apparatus overlaps with the battery.

Further, according to another aspect of the present disclosure, provided is a mobile terminal, characterized in that a pad disposed between the upper casing and the seating portion is further included, and the pad is in a mesh shape.

Further, according to another aspect of the present disclosure, provided is a mobile terminal including a front frame, a rear frame coupled to a rear face of the front frame to define an electronic component portion between the front frame and the rear frame, and a mosquito repellent apparatus disposed on an inner face of the rear frame and exposed outwardly of the rear frame, wherein the mosquito repellent apparatus includes an upper casing for defining first multi-holes therein, a lower casing coupled to the upper casing, and defining a separate space together with the upper casing between the lower casing and the upper casing, and a vibrator including a copperplate layer and a ceramic layer, and disposed in the separate space, wherein the lower casing includes a planar portion and a protruding portion forming a bend from the planar portion to support an outer peripheral region of a rear face of the vibrator, wherein the upper casing includes a first face opposite to a central region of the vibrator and having the first multi-holes defined therein, a second face for forming a step from the first face to support an outer peripheral region of a front face of the vibrator, a third face for forming a step from the second face to be in contact with one region of the planar portion of the lower casing, and each first screw hole penetrating at least one point of each of one region of the planar portion and third face.

Further, according to another aspect of the present disclosure, provided is a mobile terminal, characterized in that a rear cover detachably coupled to an outer face of the rear frame and second multi-holes corresponding to the first multi-holes and defined in one region of the rear cover are further included.

Advantageous Effects

Effects of the mosquito repellent apparatus and the mobile terminal according to the present disclosure are as follows.

According to at least one of embodiments of the present disclosure, there is an advantage that the thicknesses of the mosquito repellent apparatus and the mobile terminal may be minimized.

According to at least one of embodiments of the present disclosure, there is an advantage that rigidity may be secured.

According to at least one of embodiments of the present disclosure, there is an advantage that a probability of occurrence of short may be minimized.

A further scope of the applicability of the present disclosure will become apparent from a detailed description below. However, because various changes and modifications within the spirit and scope of the present disclosure may be clearly understood by those skilled in the art, it is to be understood that the detailed description and the specific embodiments, such as the preferred embodiments of the present disclosure, are given by way of example only.

BEST MODE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage and the like.

Figure 1A:
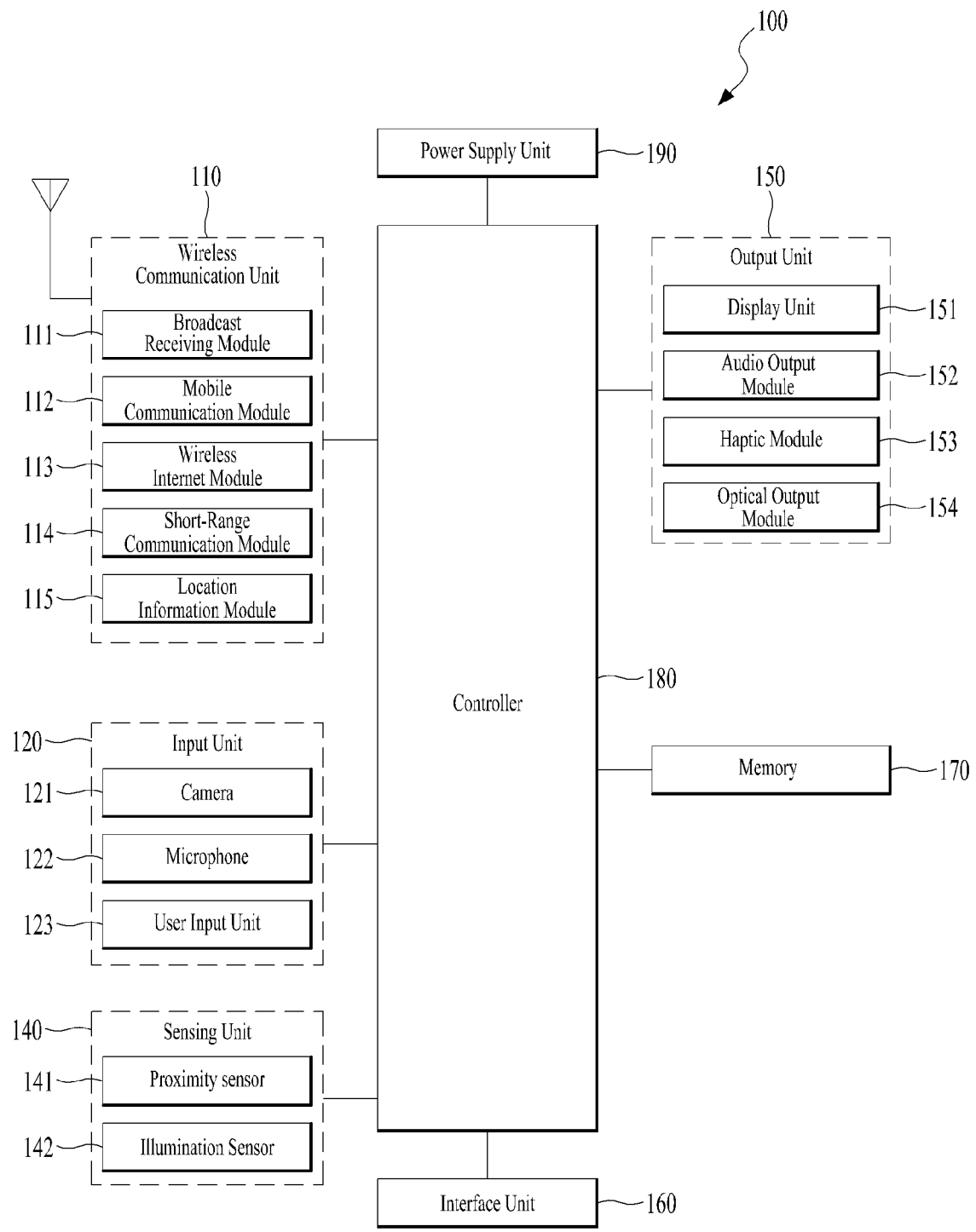
FIG. 1A is a block diagram for illustrating a mobile terminal associated with the present disclosure.
Figure 1B:
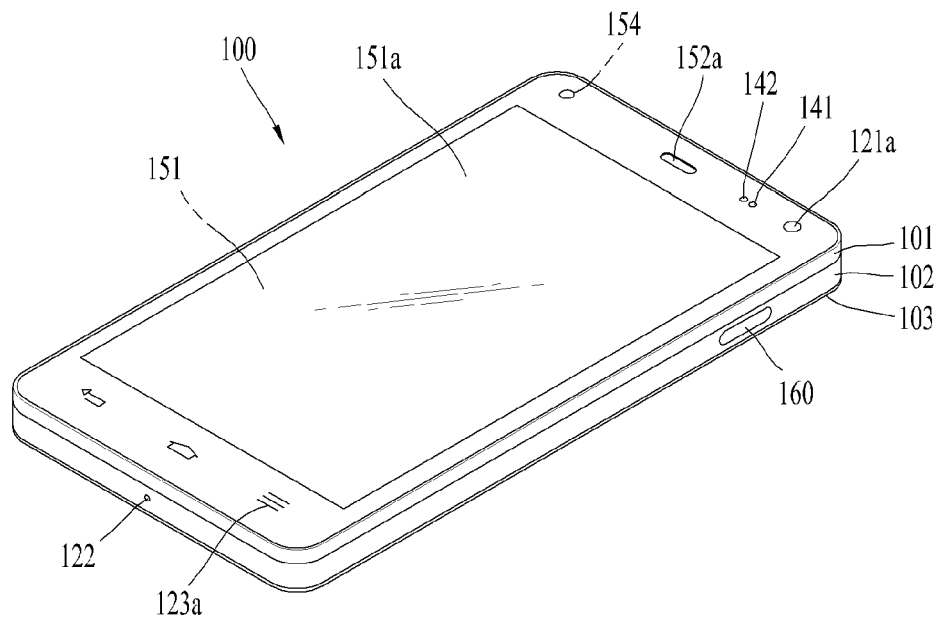
FIG. 1B and FIG. 1C are conceptual views of one example of a mobile terminal associated with the present disclosure viewed from different directions.
Figure 1C:
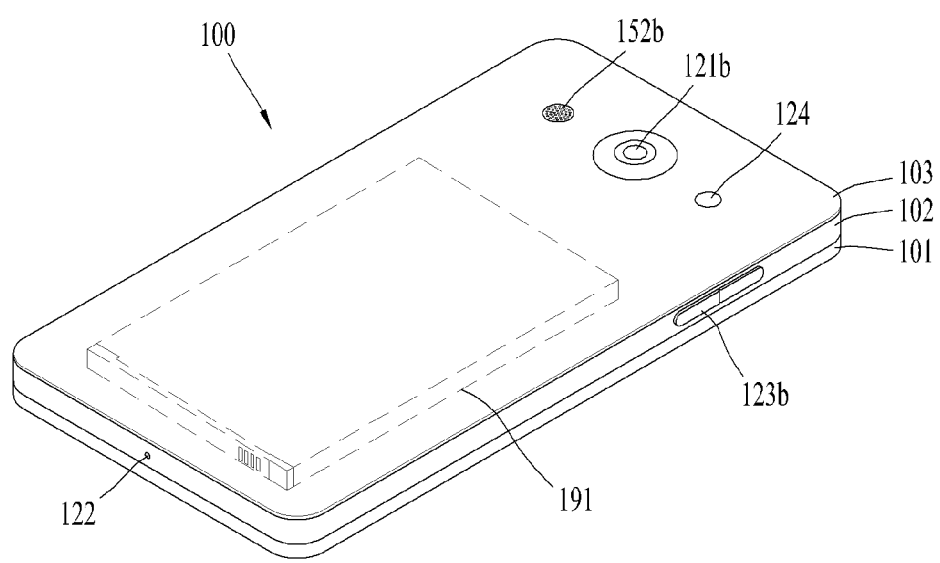

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the components illustrated in FIG. 1A is not a requirement, and that greater or fewer components may alternatively be implemented in the mobile terminal 100.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combine and operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or a current position) of the mobile terminal 100. As an example, the location information module 115 includes a Global Position System (GPS) module, a Wi-Fi module, or both. As one example, when the mobile terminal uses a GPS module, a position of the mobile terminal 100 may be acquired using a signal sent from a GPS satellite. As another example, when the mobile terminal uses the Wi-Fi module, a position of the mobile terminal 100 can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is to obtain the position of the mobile terminal 100 and thus is not limited to any module for directly detect or calculate the position of the mobile terminal 100.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations.

Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In the followings, a terminal body is used to designate the mobile terminal 100 as a single assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a, 152b, a proximity sensor 141, an illumination sensor 142, an optical output module 154, first and second cameras 121a, 121b, first and second manipulation units 123a, 123b, a microphone 122, an interface unit 160 and the like.

FIGS. 1B and 1C depict certain components as arranged on the mobile terminal. For example, the display unit 151, the first audio output module 152, the proximity sensor 141, the illumination sensor 142, the optical output module 154, the first camera 121a, and the first manipulation unit 123a are located at a front surface of the terminal body, the second manipulation unit 123b, the microphone 122, and the interface unit 160 are located at a side surface of the terminal body, and the second audio output module 152b and the second camera 121b are located at a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display execution screen information of an application executed at the mobile terminal 100, or user interface (UI)/graphic user interface (GUI) information according to the execution screen information.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 (see FIG. 1A) for supplying power to the mobile terminal 100 is provided to the mobile terminal 100. The power supply unit 190 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can be also provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
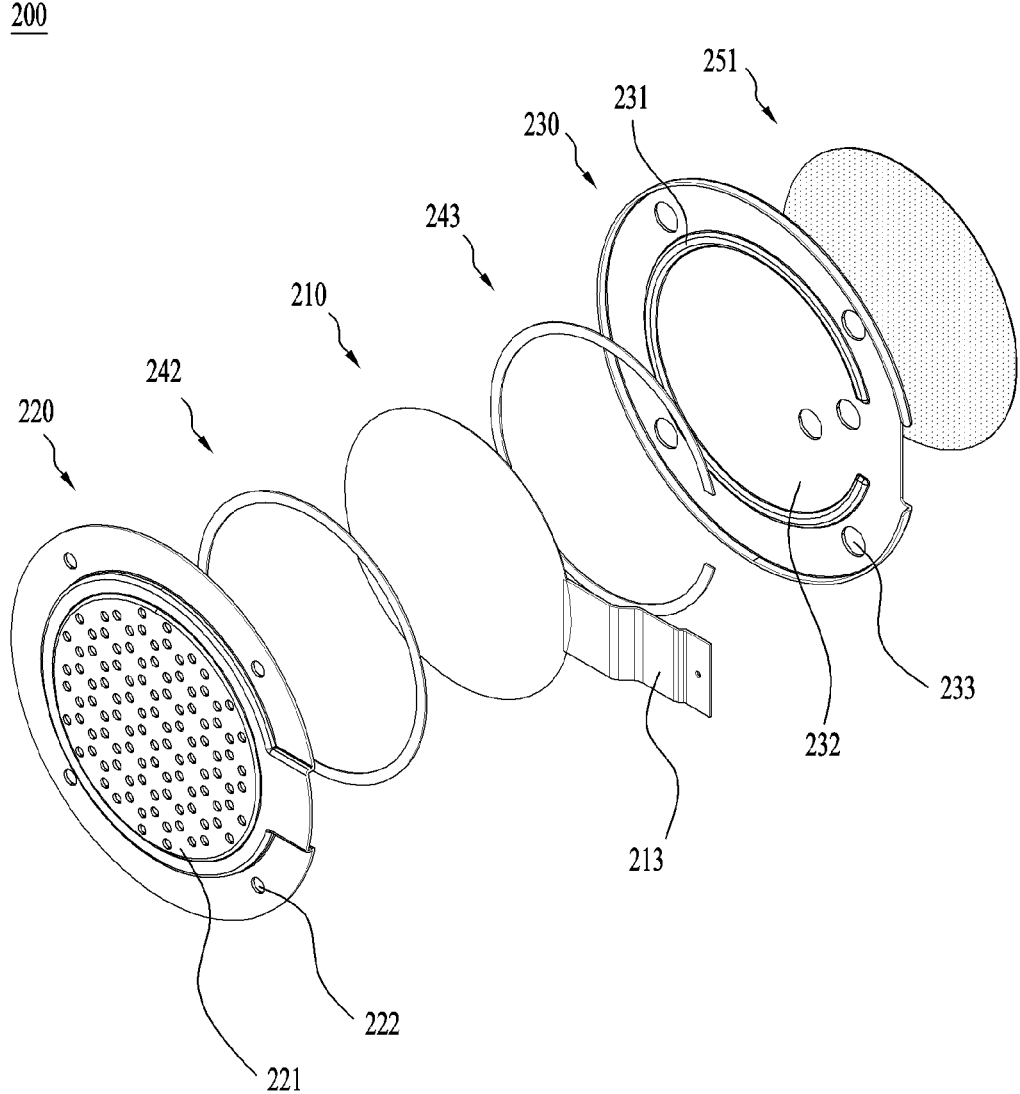
FIG. 2 is an exploded perspective view of a mosquito repellent apparatus associated with the present disclosure.
Figure 3:
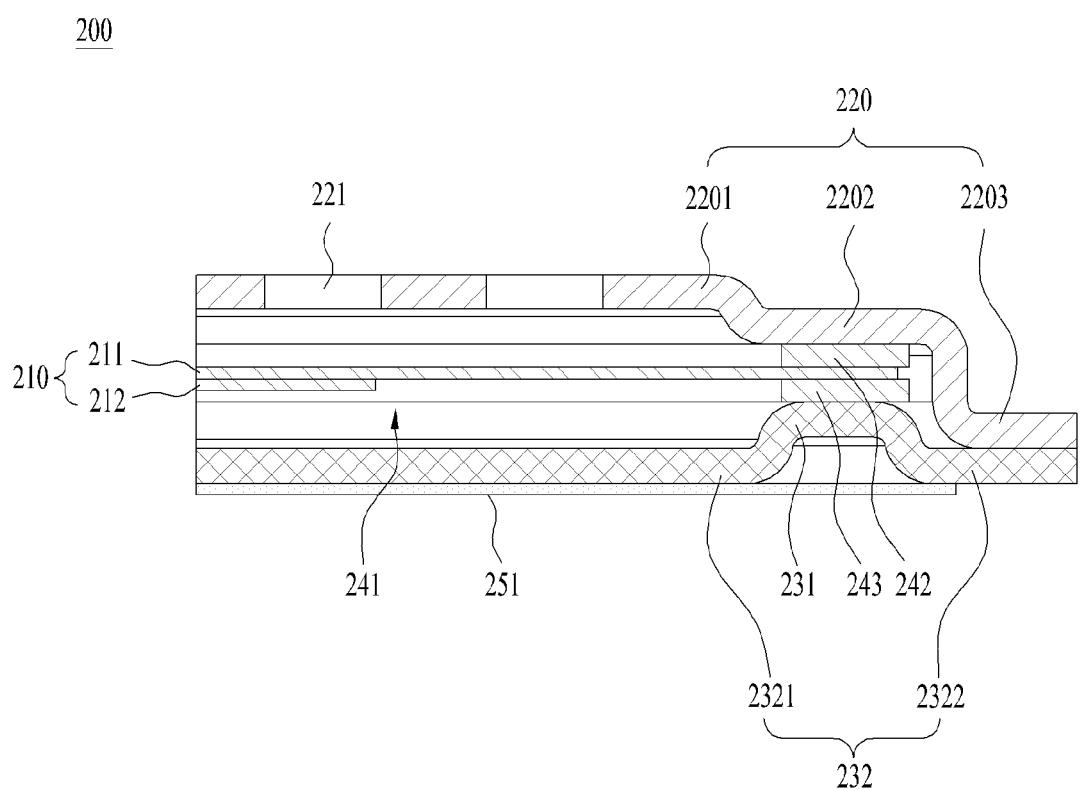
FIG. 3 is a cross-sectional view of a mosquito repellent apparatus associated with the present disclosure.

FIG. 2 is an exploded perspective view of a mosquito repellent apparatus 200 associated with the present disclosure, and FIG. 3 is a cross-sectional view of the mosquito repellent apparatus 200 associated with the present disclosure. For convenience of description, FIGS. 2 and 3 are referred to together.

A vibrator 210 generates a high frequency that repels a mosquito by vibration. The vibrator 210 may include a copperplate layer 211 and a ceramic layer 212. Terminals may be respectively connected to the copperplate layer 211 and the ceramic layer 212, and may vibrate as an electric signal is received. One of the two terminals may be electrically connected to the copperplate layer 211, and the other thereof may be electrically connected to the ceramic layer 212. The two terminals may be drawn to the outside through a flexible printed circuit board 213.

An upper casing 220 and a lower casing 230 mount the vibrator 210 therebetween to fix the vibrator 210 and to simultaneously secure a vibration space of the vibrator 210.

The upper casing 220 may be disposed in a direction in which the high frequency generated from the vibrator 210 is emitted. The upper casing 220 may define multi-holes therein to secure a path through which the high frequency is emitted. The multi-holes of the upper casing 220 are defined as first multi-holes 221 to be distinguished from multi-holes of another component to be described later.

The lower casing 230 may be coupled to the upper casing 220 to define a separate space 241 therein. At least a portion of the separate space 241 may be the vibration space of the vibrator 210.

A first face 2201 of the upper casing 220 may provide a face with the first multi-holes 221 defined therein. The first face 2201 may be spaced apart from a top face of the vibrator 210 by a first distance. The first distance may be 0.5 mm.

A second face 2202 of the upper casing 220 may form a step from the first face 2201 to support an outer peripheral region of a front face 2101 of the vibrator 210. That is, the second face 2202 serves to hold the vibrator 210. The support of the front face 2101 of the vibrator 210 by the second face 2202 may be implemented using an adhesive tape. For convenience, the adhesive tape disposed on the front face 2101 of the vibrator 210 is defined as an upper tape 242. A spacing between the second face 2202 and the vibrator 210 may be specified in consideration of a thickness of the upper tape 242.

A planar portion 232 of the lower casing 230 may include a face corresponding to the first face 2201 of the upper casing 220. That is, the planar portion 232 may be disposed to be spaced apart from a bottom face of the vibrator 210 by a second distance. Like the first distance, the second distance may be 0.5 mm from a rear face of the vibrator 210. The first distance or the second distance is based on the most front face or the most rear face of the vibrator 210.

The separate space 241 may be defined between the first face 2201 of the upper casing 220 and the planar portion 232 of the lower casing 230 to secure the vibration space of the vibrator 210.

The protruding portion 231 may form a bend from the planar portion 232 of the lower casing 230 to protrude inward to support an outer peripheral region of the bottom face of the vibrator 210. That is, the second face 2202 of the upper casing 220 and the protruding portion 231 respectively hold the outer peripheral regions of the front and the rear faces of the vibrator 210. Like the front face 2101 of the vibrator 210, an adhesive tape may be disposed between the protruding portion 231 and the vibrator 210, so that the protruding portion 231 and the vibrator 210 may be fixed to each other. For convenience, such adhesive tape is defined as a lower tape 243.

The upper tape 242 and the lower tape 243 may contain a soft material so as not to affect the number of vibrations considered in a design as much as possible. When the upper tape 242 and the lower tape 243 are made of a hard material, in addition to the vibrator 210, the upper casing 220 and the lower casing 230 may also function as a single vibrating member, so that an unintended number of vibrations may occur. The upper tape 242 and the lower tape 243 of the soft material allow the vibrator 210 to vibrate independently. For the same purpose, each of the upper tape 242 and the lower tape 243 may have a thickness of 0.2 mm in order to perform a sufficient damping action against the vibration. In addition, the sufficient thickness of 0.2 mm also prevents an occurrence of short by a contact of the vibrator 210 to the upper casing 220 or the lower casing 230 by the vibration thereof or by a flow of an unintended current from the upper casing 220 or the lower casing 230 to the vibrator 210.

The upper casing 220 and the lower casing 230 may be made of a rigid material for protection of the vibrator 210. Representatively, the upper casing 220 and the lower casing 230 may contain STS. When the upper casing 220 and the lower casing 230 are made of the STS, the mosquito repellent apparatus 200 may be implemented with a smaller thickness than that with the upper casing 220 and the lower casing 230 made of a PC injection product, thereby reducing an overall thickness of the rear cover 103.

The planar portion 232 may include an inner planar portion 2321 inward of the protruding portion 231 supporting the outer peripheral region of the rear face 2102 of the vibrator 210, and an outer planar portion 2322 outward of the protruding portion 231. The inner planar portion 2321 serves to secure a distance from the vibrator 210 described above, and the outer planar portion 2322 serves as a region extended from the inner planar portion 2321. Accordingly, the outer planar portion 2232 may form the same face as the inner planar portion 2321. The outer planar portion 2322 serves as a counterpart for coupling when the mosquito repellent apparatus 200 is coupled with another apparatus to be described later.

A third face 2203 of the upper casing 220 forms a step from the second face 2202 of the upper casing 220 to be in contact with one region of the planar portion 232 of the lower casing 230, that is, the outer planar portion 2322.

The third face 2203 of the upper casing 220 may be in contact with the outer planar portion 2322 of the lower casing 230 to form the coupling counterpart. A screw hole may be defined at at least one point of the third face 2203 and the outer planar portion 2322 in contact with each other, so that the upper casing 220 and the lower casing 230 may be coupled with each other by screw coupling. For convenience of description, the screw holes defined in the planar portion 232 and the third face 2203 are defined as first screw holes 222 and 233.

The outer planar portion 2322 and the third face 2203 are provided to be in contact with each other to minimize unnecessary volume increase.

When the vibrator 210, the upper casing 220, and the lower casing 230 have circular shapes, the third face 2203 of the upper casing 220 and the outer planar portion 2322 of the lower casing 230 may have donut shapes. In this connection, each of the first screw holes 222 and 233 may include four holes positioned at four points on a donut-shaped plane and spaced apart from each other. Each of the first screw holes 222 and 233 including the four holes spaced apart from each other on the donut-shaped plane may form a stable structure.

The structure of the upper casing 220 and the lower casing 230 may have a specific shape by a stamping process. That is, the upper casing 220 forms each of the steps between the first face 2201, the second face 2202, and the third face 2203 by the stamping process on a parent member of a flat plate layer, and simultaneously define the first multi-holes 221. In addition, the protruding portion 231 may be protruded from the lower casing 230 by the stamping process on the parent member of the flat plate layer.

The first screw holes 222 and 233 may also be defined through the stamping process.

A blocking film 251 is disposed on the rear face of the lower casing 230 to prevent inflow of dust and the like from the outside.

The mosquito repellent apparatus 200 may operate alone, or as described above, may be coupled to the apparatus that performs another function, for example, the mobile terminal 100 that performs the mobile function to perform a function. In this case, the present disclosure may be largely divided into two embodiments based on arrangements of the mosquito repellent apparatus 200.

Figure 4:
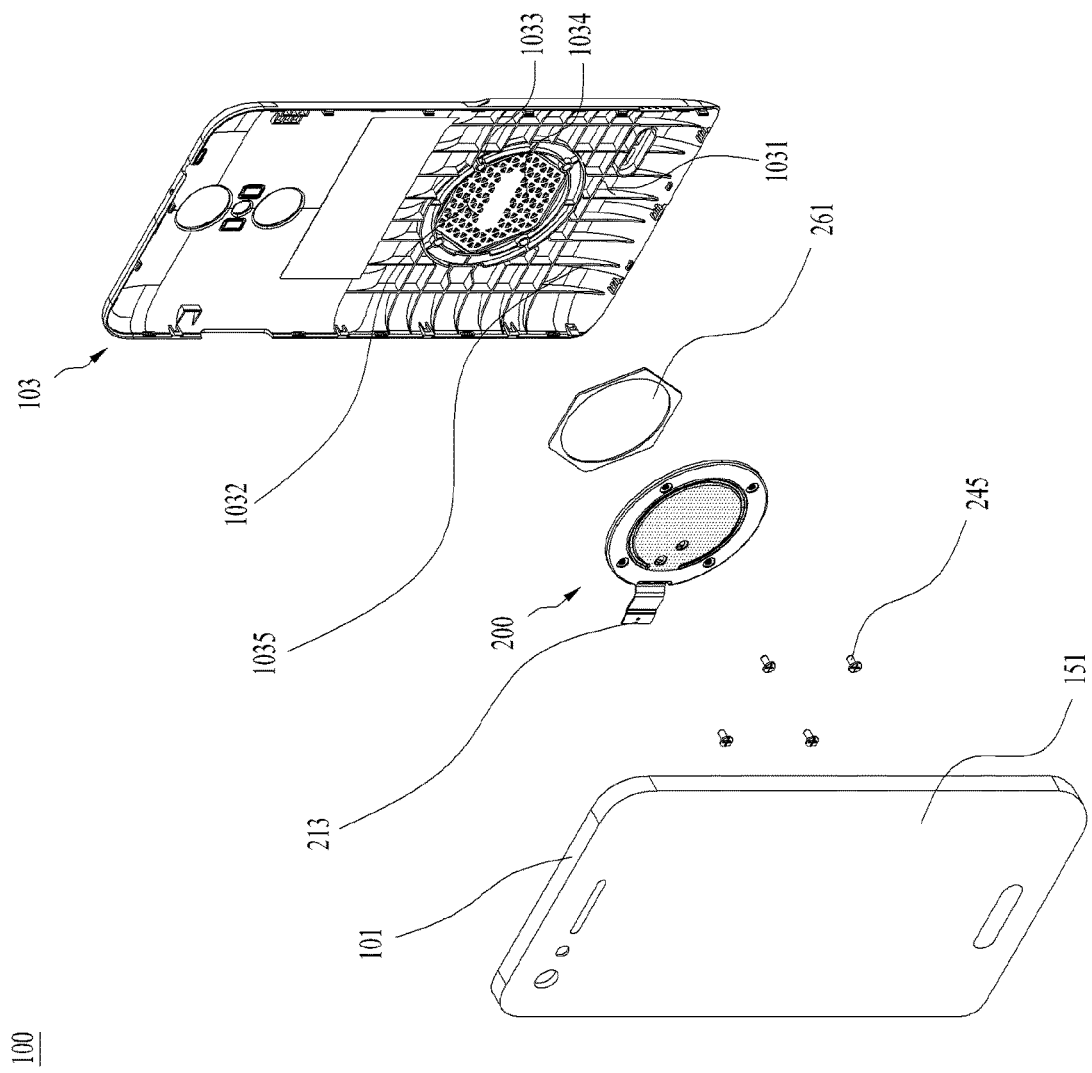
FIG. 4 is a partial exploded perspective view of a mobile terminal associated with the present disclosure.
Figure 5:
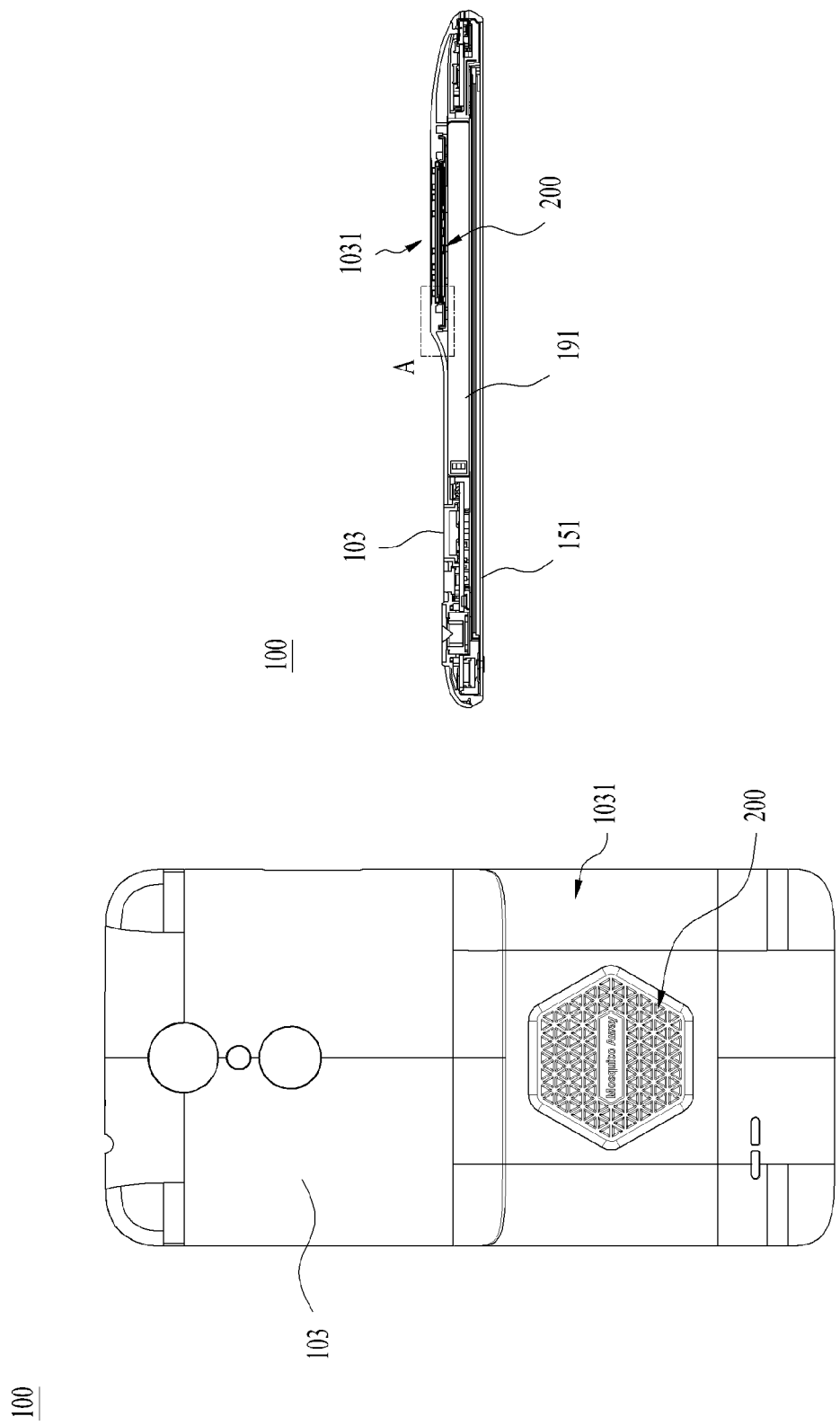
FIG. 5 is a coupling rear view and a coupling cross-sectional view of a mobile terminal of an embodiment of FIG. 4.

FIG. 4 is a partial exploded perspective view of the mobile terminal 100 associated with the present disclosure, and FIG. 5 is a coupling rear view and a coupling cross-sectional view of the mobile terminal 100 of an embodiment of FIG. 4. Further, FIG. 6 is a coupling rear view and a coupling cross-sectional view of a mobile terminal according to another embodiment.

The mosquito repellent apparatus 200 may be disposed on the rear cover 103 of the mobile terminal 100. The rear cover 103 refers to a cover disposed at the rearmost portion for covering the battery in the mobile terminal 100 with the removable battery structure as described above. Because the rear cover 103 is able to be detachably coupled to the rear faces of the frames 101 and 102, the rear cover 103 may be replaced with another rear cover 103 when it is necessary. Thus, when the mosquito repellent apparatus 200 is disposed on the rear cover 103, there is an advantage in that the mosquito repellent apparatus 200 may be attached to or removed from the mobile terminal 100 as necessary.

The mosquito repellent apparatus 200 may be coupled to an inner face of the rear cover 103. At least one region of the rear cover 103 may have rearwardly protruding shape for disposing the mosquito repellent apparatus 200 thereon. Said one region is defined as an extended region 1031.

Figure 6:
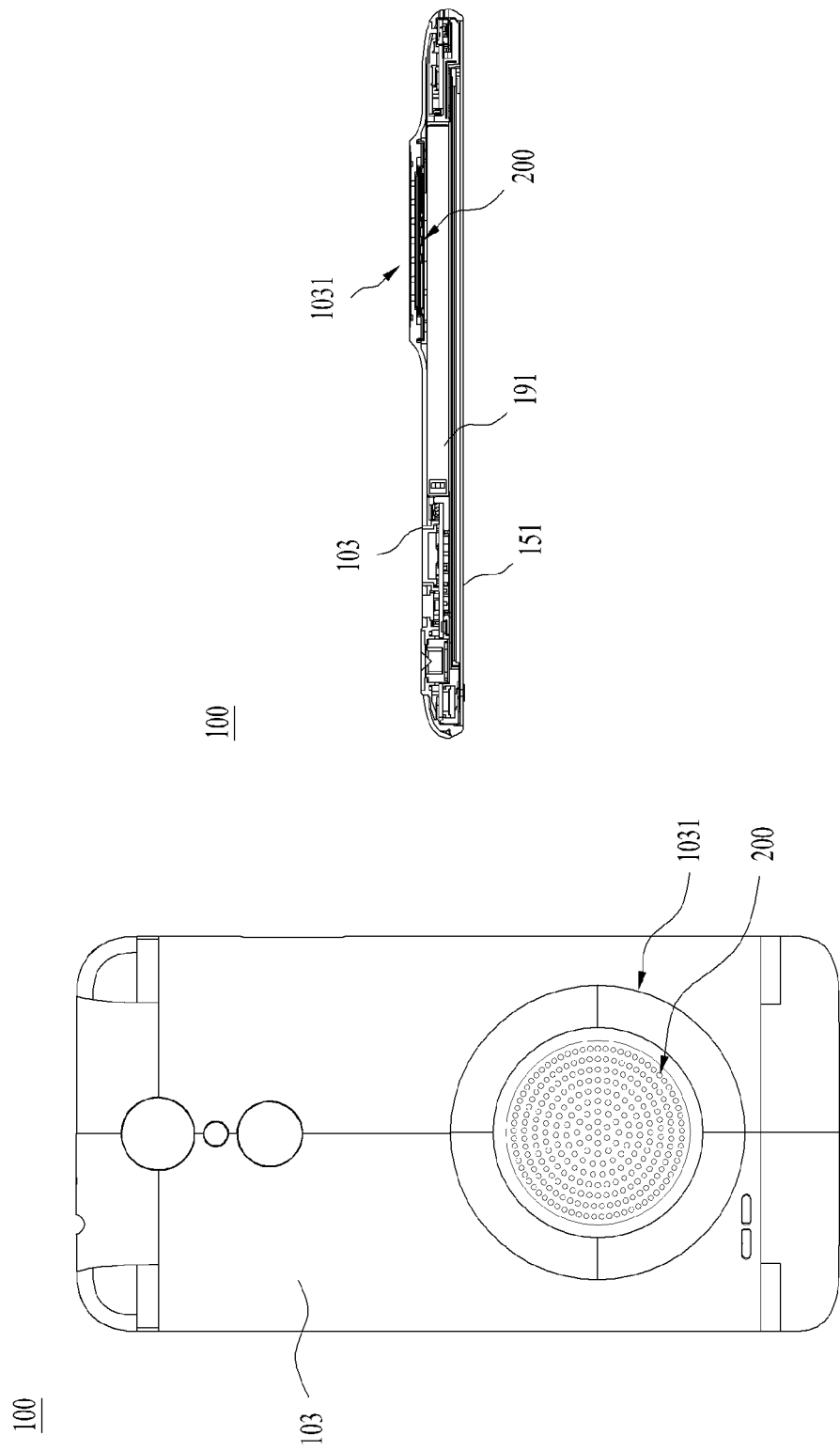
FIG. 6 is a coupling rear view and a coupling cross-sectional view of a mobile terminal according to another embodiment.

For example, the extended region 1031 may mean a bottom half region of the rear cover 103 as in the embodiment of the mobile terminal 100 of FIGS. 4 and 5, or may have a minimum size corresponding to only a region of the mosquito repellent apparatus 200 as in the embodiment of the mobile terminal 100 of FIG. 6.

When the bottom half region becomes the extended region 1031 as in the embodiment of the mobile terminal 100 of FIGS. 4 and 5, it may prevent increasing of an overall thickness of the mobile terminal 100, and at the same time, facilitating user's gripping by thickening a bottom region.

On the other hand, as shown in FIG. 6, when the thickness of the frame is sufficiently large, it may be better for the extended region 1031 occupying a minimum area. Unlike the shape of the mobile terminal 100 of FIGS. 4 and 5, there is no increase in thickness of an outer region of the mobile terminal 100, which is generally gripped by the user, which is appropriate in this case.

Hereinafter, a description will be achieved based on the shape of the mobile terminal 100 of FIGS. 4 and 5. The description may be applied to the shape of the mobile terminal 100 of FIG. 6 within a range of features that do not contradict.

A seating portion 1032 for defining a region in which the mosquito repellent apparatus 200 is seated may be defined in one region of the inner face of the rear cover 103 corresponding to the extended region 1031. In particular, the upper casing 220 may be seated in the seating portion 1032 such that the face of the upper casing 220 of the mosquito repellent apparatus 200 faces the inner face of the rear cover 103.

The mosquito repellent apparatus 200 may be screwed to the seating portion 1032 of the rear cover 103. A second screw hole 1033 corresponding to the positions of the first screw holes 222 and 233 described above may be defined in the rear cover 103.

An outlet portion may be defined in the seating portion 1032 to define second multi-holes 1034 corresponding to the first multi-holes 221 therein. The number of holes of the first multi-holes 221 may be the same as the number of holes of the second multi-holes 1034. This is to minimize blockage of the high frequency emitted from the first multi-holes 221 by the rear cover 103.

However, hole shapes of the first multi-holes 221 and the second multi-holes 1034 do not need to be completely coincident with each other. For example, each of the first multi-holes 221 may be formed in a circular shape, and each hole of the second multi-holes 1034 may be formed in a triangular shape.

A pad 261 may be disposed between a mosquito repellent module and the seating portion 1032. The pad 261 may be made of a thin mesh material to block foreign substances from entering the mosquito repellent apparatus 200 from the outside and simultaneously to allow the high frequency to pass therethrough.

A region other than the seating portion 1032 of the inner face of the protruding region defines a recessed portion that is a recessed region. When the recessed portion is defined simply, as the rear cover 103 is pressed from the outside, the recessed portion may be pressed or bent, which may cause damage to the mosquito repellent apparatus 200 or the rear cover 103.

The ribs 1035 are formed on an inner face of the recessed portion to secure a rigidity of the rear cover 103. The ribs 1035 may form a lattice pattern on the inner face of the recessed portion.

The flexible printed circuit board 213 may be drawn out between the upper casing 220 and the lower casing 230, so that a terminal of one region of the flexible printed circuit board 213 may be exposed to the inner face of the rear cover 103. The terminal of one region of the flexible printed circuit board 213 exposed to the inner face of the rear cover 103 may be electrically connected to a terminal disposed on the frame rear face in a state in which the rear cover 103 is coupled to the frame, thereby performing a function of generating the high frequency.

Figure 7:
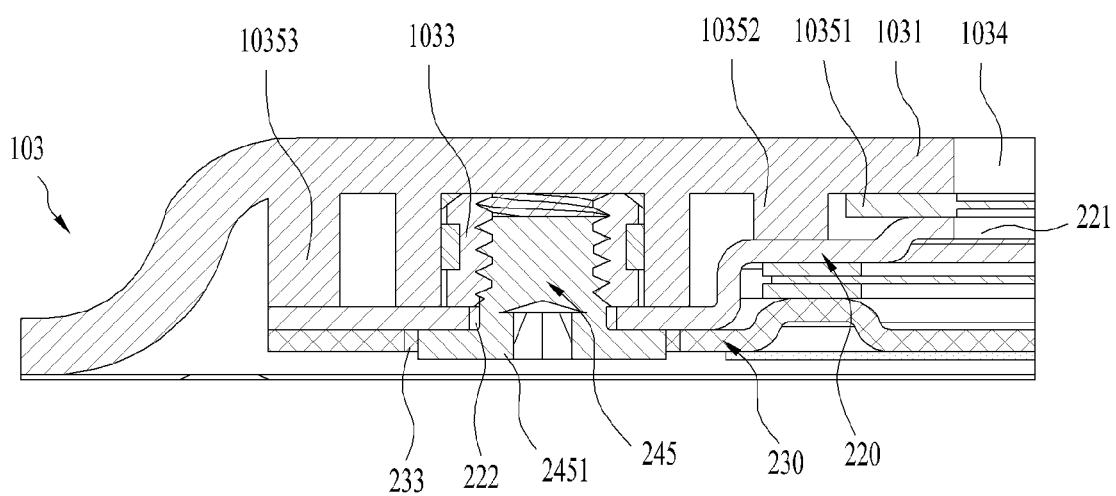
FIG. 7 is an enlarged view of a region A of FIG. 5.

FIG. 7 is an enlarged view of a region A of FIG. 5.

The seating portion 1032 of the rear cover 103 may include a first bracket 10351 for supporting the first face 2201 of the mosquito repellent apparatus 200, a second bracket 10352 for supporting the second face 2202, and a third bracket 10353 for supporting the third face 2203. The first bracket 10351, the second bracket 10352, and the third bracket 10353 may protrude from the inner face of the rear cover 103 to support the upper casing 220. In particular, the pad 261 described above may perform a role of the first bracket 10351 instead of the first bracket 10351.

The third bracket 10353 supports the third face 2203, and at the same time, secures a space in which the second screw hole 1033 is defined. The second screw hole 1033 may be integrally defined with the rear cover 103 in a manner such as injection or the like when forming the rear cover 103, or may be coupled to the rear cover 103 by forming a separate additional member as shown.

The outer planar portion 2232 of the lower casing 230 forms the same plane as the inner planar portion 2321, so that the third face 2203 is disposed to be biased to the lower casing 230 as much as possible, thereby securing a space in which a thread of the second screw hole 1033 is disposed.

The second bracket 10352 and the third bracket 10353 may be arranged as a portion of the region in which the ribs 1035 described above are arranged. That is, the second bracket 10352 and the third bracket 10353 have lengths different from a length of the ribs 1035 described above, but have the same pattern as the ribs 1035, thereby serving as the ribs 1035.

As in the previous embodiment, the screw 245 may fix the upper casing 220 and the lower casing 230 to the rear cover 103, but may fix only between the upper casing 220 and the rear cover 103 to minimize a coupling thickness of the mosquito repellent apparatus 200 and the rear cover 103. When the first screw hole 233 of the lower casing 230 is formed larger than a screw head 2452, the screw head 2452 may be seated inside the first screw hole 233 of the lower casing 230 to minimize the increase in thickness.

Figure 8:
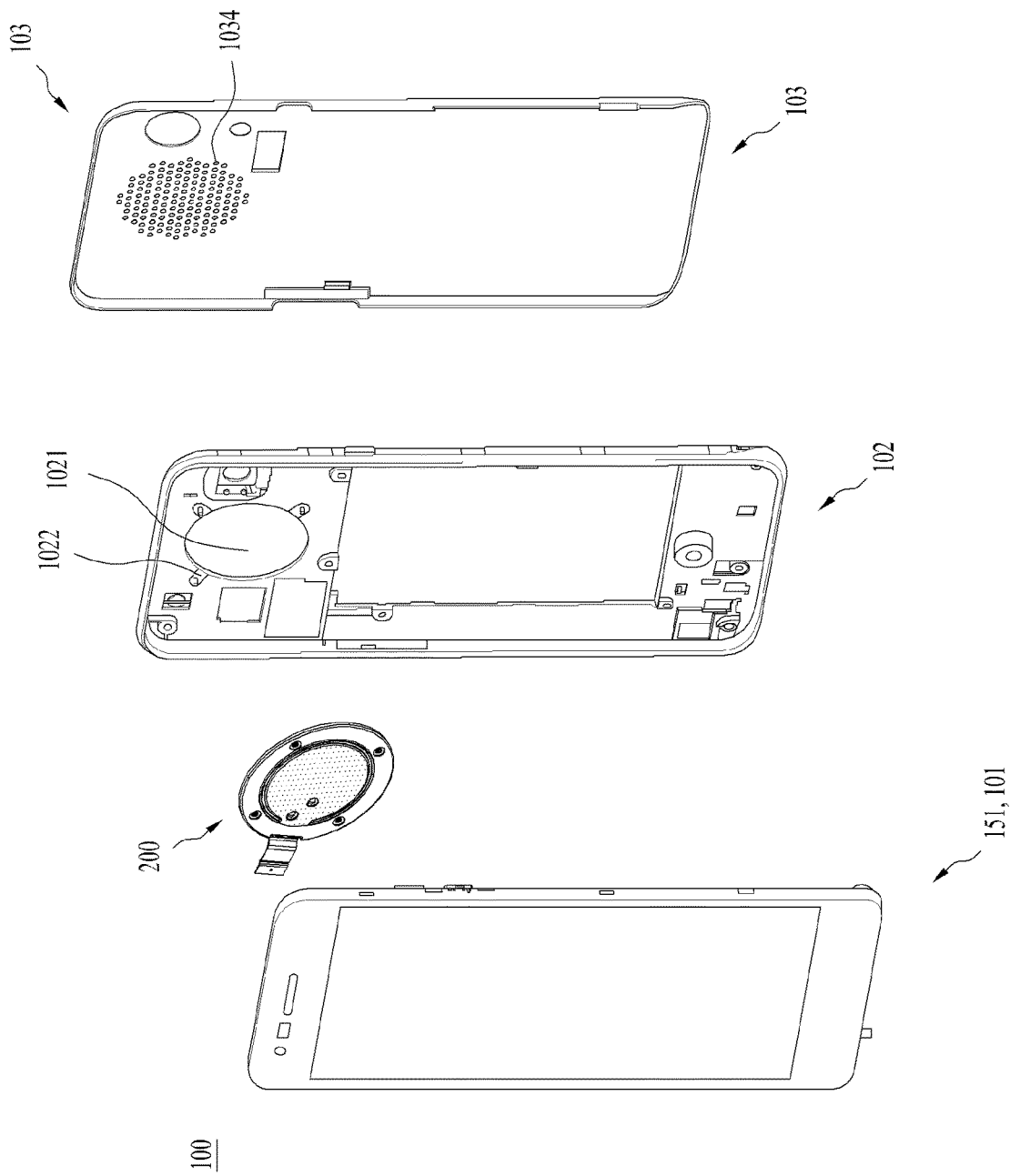
FIG. 8 is an exploded perspective view of a mobile terminal of another embodiment.
Figure 9:
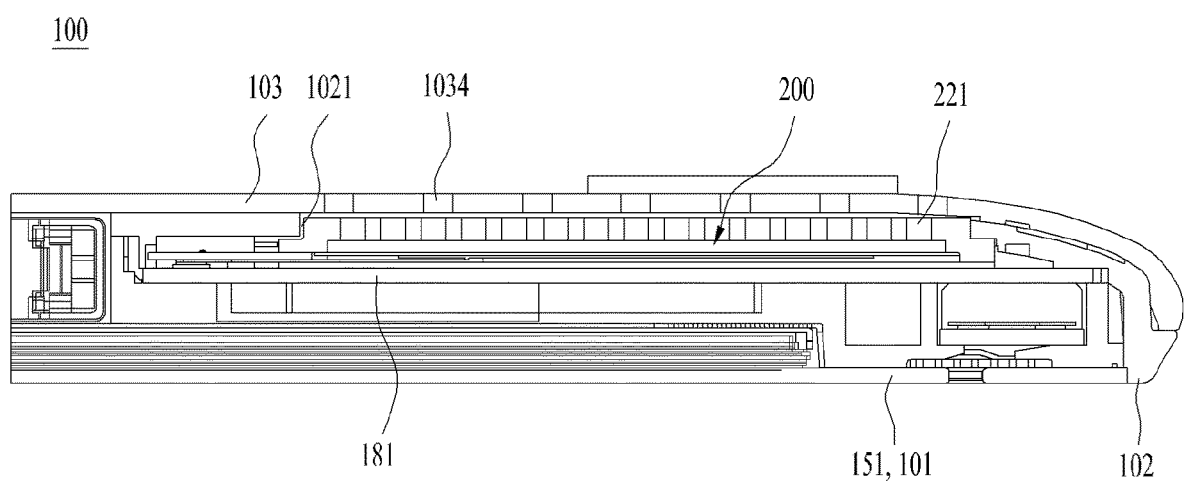
FIG. 9 is a partial cross-sectional view of coupling of a mobile terminal of FIG. 8.

FIG. 8 is an exploded perspective view of the mobile terminal 100 of another embodiment, and FIG. 9 is a partial cross-sectional view of coupling of the mobile terminal 100 of FIG. 8.

The embodiments of the mobile terminal 100 of FIGS. 4 to 7 illustrate the case in which the mosquito repellent apparatus 200 is disposed on the rear cover 103, in particular, on a region overlapping the battery. However, an embodiment of the mobile terminal 100 of FIGS. 8 and 9 illustrate that the mosquito repellent apparatus 200 is disposed on the rear frame of the frames.

The rear frame refers to a frame coupled to the rear face of the front frame as described above. The coupling of the front frame and the rear frame may define an electronic component portion between the front frame and the rear frame, so that main electronic components such as a main-PCB and the like may be mounted in the electronic component portion. In some cases, without classification of the front frame and the rear frame, the frames may be formed as a single frame on which the display unit is seated and forming the electronic component portion. The present embodiment will be described on the premise that the rear cover 103 is disposed on the rear face of the rear frame.

In the embodiments of the mobile terminal 100 of FIGS. 4 to 7, because the mosquito repellent apparatus 200 is located at a rear portion of the rear casing, an increase in thickness of an entirety of the mobile terminal 100 is inevitable.

The embodiment of the mobile terminal 100 of FIGS. 8 and 9 may consider a method for solving such problem to define a space inside the rear frame and dispose the mosquito repellent apparatus 200 in the corresponding region, thereby minimizing the increase in the thickness of the mobile terminal 100.

The rear frame is coupled to the rear face of the front frame to define the electronic component portion of the mobile terminal 100 therebetween. The main-printed circuit board (main-PCB) for mounting electronic components thereon may be disposed inside the rear frame.

In the present embodiment, the mosquito repellent apparatus 200 may be mounted on a rear face of the main PCB.

The rear frame may define an opening 1021 for exposing the mosquito repellent apparatus 200 to the outside. The mosquito repellent apparatus 200 may be coupled with the rear frame instead of the main PCB to prevent damage to the main PCB during the coupling process. The rear frame has a third screw hole 1022 at a point corresponding to the first screw holes 222 and 233 of the mosquito repellent apparatus 200 on the inner face thereof. Further, the first screw holes 222 and 233 and the third screw hole 1022 may be fastened with each other by the screw 245.

MODE FOR INVENTION

It is apparent to those skilled in the art that the present disclosure may be embodied in other specific forms without departing from the spirit and essential characteristics of the present disclosure.

The above detailed description should not be construed as limiting in all aspects and should be considered as illustrative. The scope of the present disclosure should be determined by reasonable interpretation of the appended claims, and all changes within the equivalent scope of the present disclosure are included in the scope of the present disclosure.

INDUSTRIAL APPLICABILITY

As described above, all or some of the features of the present disclosure may be used in any mosquito repellent apparatus or mobile terminal.

The invention claimed is:
1. A mosquito repellent apparatus comprising:
an upper casing for defining first multi-holes therein;
a lower casing coupled to the upper casing, and defining a separate space together with the upper casing between the lower casing and the upper casing; and
a vibrator including a copperplate layer and a ceramic layer, and disposed in the separate space,
wherein the lower casing includes:
a planar portion; and
a protruding portion forming a bend from the planar portion to support an outer peripheral region of a rear face of the vibrator,
wherein the upper casing includes:
a first face opposite to a central region of the vibrator and having the first multi-holes defined therein;
a second face for forming a step from the first face to support an outer peripheral region of a front face of the vibrator;

a third face for forming a step from the second face to be in contact with one region of the planar portion of the lower casing; and first screw holes respectively penetrating one point of one region of the planar portion and one point of the third face overlapping said one point of the planar portion.

2. The mosquito repellent apparatus of claim 1, wherein the upper casing contains STS, and wherein the first face, the second face, the third face, and the first screw holes are formed at the same time through a stamping process.

3. The mosquito repellent apparatus of claim 1, further comprising:

a soft lower tape disposed between the protruding portion and the outer peripheral region of the rear face of the vibrator; and a soft upper tape disposed between the second face and an outer peripheral region of a top face of the vibrator.

4. The mosquito repellent apparatus of claim 1, wherein the vibrator has a circular shape, wherein each of one region of the planar portion and the third face includes a donut-shaped plane, and wherein each of the first screw holes includes four holes positioned at four points on each of the donut-shaped planes and spaced apart from each other.

5. A mobile terminal comprising:

a frame for defining an electronic component portion;

a battery disposed on a rear face of the frame;

a rear cover detachably coupled to the rear face of the frame; and a mosquito repellent apparatus coupled to an inner face of the rear cover, wherein the mosquito repellent apparatus includes:

an upper casing for defining first multi-holes therein;

a lower casing coupled to the upper casing, and defining a separate space together with the upper casing between the lower casing and the upper casing; and a vibrator including a copperplate layer and a ceramic layer, and disposed in the separate space, wherein the lower casing includes:

a planar portion; and a protruding portion forming a bend from the planar portion to support an outer peripheral region of a rear face of the vibrator, wherein the upper casing includes:

a first face opposite to a central region of the vibrator and having the first multi-holes defined therein;

a second face for forming a step from the first face to support an outer peripheral region of a front face of the vibrator;

a third face for forming a step from the second face to be in contact with one region of the planar portion of the lower casing; and each first screw hole penetrating at least one point of each of one region of the planar portion and third face.

6. The mobile terminal of claim 5, wherein the rear cover includes:

a seating portion defined in one region of an inner face thereof to define a region for seating the upper casing of the mosquito repellent apparatus therein;

a recessed portion defined in one region around the seating portion to define a region recessed outwardly;

a second screw hole defined at a position of the seating portion corresponding to positions of the first screw holes;

a screw penetrating the first screw holes and the second screw hole;

an outlet portion defined in the seating portion to define second multi-holes corresponding to the first multi-holes; and ribs forming a lattice pattern formed on an inner face of the recessed portion.

7. The mobile terminal of claim 6, further comprising a pad disposed between the upper casing and the seating portion, and wherein the pad is in a mesh shape.

8. The mobile terminal of claim 5, wherein at least one region of the mosquito repellent apparatus overlaps with the battery.

9. A mobile terminal comprising:

a front frame;

a rear frame coupled to a rear face of the front frame to define an electronic component portion between the front frame and the rear frame; and a mosquito repellent apparatus disposed on an inner face of the rear frame and exposed outwardly of the rear frame, wherein the mosquito repellent apparatus includes:

an upper casing for defining first multi-holes therein;

a lower casing coupled to the upper casing, and defining a separate space together with the upper casing between the lower casing and the upper casing; and a vibrator including a copperplate layer and a ceramic layer, and disposed in the separate space, wherein the lower casing includes:

a planar portion; and a protruding portion forming a bend from the planar portion to support an outer peripheral region of a rear face of the vibrator, wherein the upper casing includes:

a first face opposite to a central region of the vibrator and having the first multi-holes defined therein;

a second face for forming a step from the first face to support an outer peripheral region of a front face of the vibrator;

a third face for forming a step from the second face to be in contact with one region of the planar portion of the lower casing; and each first screw hole penetrating at least one point of each of one region of the planar portion and third face.

10. The mobile terminal of claim 9, further comprising:

a rear cover detachably coupled to an outer face of the rear frame; and second multi-holes corresponding to the first multi-holes and defined in one region of the rear cover.

* * * * *